United States Patent [19]
Bianchetti et al.

[11] Patent Number: 6,028,045
[45] Date of Patent: Feb. 22, 2000

[54] STABLE STRONGLY ACIDIC AQUEOUS COMPOSITIONS CONTAINING PERSULFATE SALTS

[75] Inventors: Giulia Ottavia Bianchetti; Stefano Scialla, both of Rome; Sandro Campestrini, Trento; Fulvio DiFuria, Padua, all of Italy

[73] Assignee: The Procter & Gamble Company, Cincinnati, Ohio

[21] Appl. No.: 08/704,692

[22] PCT Filed: Feb. 27, 1995

[86] PCT No.: PCT/US95/02380

§ 371 Date: Sep. 16, 1996

§ 102(e) Date: Sep. 16, 1996

[87] PCT Pub. No.: WO95/25064

PCT Pub. Date: Sep. 21, 1995

[30] Foreign Application Priority Data

Mar. 14, 1994 [EP] European Pat. Off. .............. 94870047

[51] Int. Cl.[7] ............................ C11D 3/395; C01B 15/06; C01B 15/08
[52] U.S. Cl. .......................... 510/309; 510/191; 510/369; 510/372; 252/186.27
[58] Field of Search ........................ 252/186.22, 186.27, 252/186.31, 186.43; 510/191, 309, 369, 372, 375; 162/7, 78; 423/513, 585

[56] References Cited

U.S. PATENT DOCUMENTS

| | | | |
|---|---|---|---|
| 4,781,854 | 11/1988 | Overton et al. | 252/186.28 |
| 4,900,468 | 2/1990 | Mitchell et al. | 8/111 |
| 4,900,469 | 2/1990 | Farr et al. | 252/186.26 |
| 5,089,162 | 2/1992 | Rapisarda et al. | 252/187.25 |
| 5,106,523 | 4/1992 | Peterson | 252/186.42 |
| 5,409,632 | 4/1995 | Showell et al. | 252/186.23 |

FOREIGN PATENT DOCUMENTS

| | | |
|---|---|---|
| 0 199 385 B1 | 3/1986 | European Pat. Off. . |
| 0 209 228 A1 | 5/1986 | European Pat. Off. . |
| 0 340 001 B1 | 4/1989 | European Pat. Off. . |
| 0 598 179 A1 | 11/1992 | European Pat. Off. . |

OTHER PUBLICATIONS

U.S. application No. 08/432,171, Martino–Vercillo, filed May 10, 1995.

*Primary Examiner*—Joseph D. Anthony
*Attorney, Agent, or Firm*—Jason J. Camp; T. David Reed

[57] ABSTRACT

Stable, aqueous compositions having a pH of from 0 to 0.9 are disclosed, which comprise a persulfate salt, or mixtures of such salts, and a free radical scavenger, or mixtures thereof. Preferred compositions are emulsions of nonionic surfactants comprising the persulfate salt and a free radical scavenger.

24 Claims, No Drawings

STABLE STRONGLY ACIDIC AQUEOUS COMPOSITIONS CONTAINING PERSULFATE SALTS

TECHNICAL FIELD

The present invention relates to cleaning and bleaching compositions comprising persulfate salts. More specifically, the cleaning and bleaching compositions according to the present invention are aqueous persulfate salts-containing compositions which exhibit excellent stability even after a long storage period. These stable compositions are suitable for laundry and household cleaning and more particularly toilet cleaning. Also they are suitable for carpet cleaning and for other applications where a strong bleaching and disinfecting action is desired, such as denture cleaning.

BACKGROUND

A great variety of bleaching and cleaning compositions have been described in the art based on persulfate salts as a bleaching agent. Furthermore, it is highly desirable to add other ingredients to such bleaching compositions such as surfactants in order to improve the detergency effect of said compositions. However, persulfate salts based compositions in aqueous liquid form have the drawback that they are not stable. Indeed, such liquid bleaching compositions based on persulfate salts decompose in the presence of other ingredients in said compositions, such as surfactants, that can be oxidized by the persulfate salts. Also persulfate salts decomposition can be catalyzed by contaminants, e.g., heavy metal ions. As a result said compositions tend to be chemically unstable and consequently tend to lose their cleaning and bleaching capacities.

It is therefore an object of the present invention to provide aqueous compositions comprising persulfate salts which are chemically stable, especially upon prolonged periods of time.

It has now been found that the stability of an aqueous persulfate salts based composition, can be improved by selecting a very narrow pH range as well as by adding a radical scavenger thereto. Indeed, the presence of both conditions, a very narrow pH range, i.e. of from 0 to 0.9, and the addition of a radical scavenger, or mixtures thereof, are necessary to achieve the desired chemical stability which will enable an aqueous persulfate salts based composition to be marketed.

As a further advantage it has been found that the compositions of the present invention having a pH of from 0 to 0.9, comprising a surfactant, e.g. a nonionic surfactant, a radical scavenger and a persulfate salt, find a preferred application in the cleaning of toilet bowls. Indeed, once a composition according to the present invention has been applied onto the top of the inclined surface of a toilet bowl, said composition slowly reaches the water, where it is diluted and thereby becomes less acidic, i.e. from about pH 0.5 to about pH 2. The compositions according to the present invention have enhanced cleaning performance in their dilute form, compared to their neat form. Actually, this "pH jump" effect allows to formulate compositions which are stable upon storage (with a pH of from 0 to 0.9) and effective in cleaning. Additionally, the compositions of the present invention exhibit good soil solubilization and soil discolouration properties both when used neat and diluted.

EP-B-209 228 discloses liquid compositions having a pH of from 1 to 8 and comprising nonionic surfactants, a peroxide compound and substituted mono- and di-hydroxybenzenes such as BHT as the radical scavenger. The '228 patent mentions that the peroxide compound is normally present as hydrogen peroxide. Persulfate salts are not disclosed.

EP-A-340 001 discloses a non-aqueous liquid composition comprising radical scavengers such as BHT and a bleach (halogen or oxygen bleach). Perborate is preferred and persulfate salts are not disclosed per se. No pH is disclosed.

EP-A-199 385 discloses compositions having a pH below 4, which comprises a peroxy compound, anionic and nonionic surfactants. No radical scavengers are disclosed.

SUMMARY OF THE INVENTION

The present invention is a stable aqueous composition comprising a persulfate salt, or mixtures thereof, and a radical scavenger, or mixtures thereof. Said composition is formulated at a pH as is of from 0 to 0.9.

Preferred herein is a stable aqueous composition in the form of an emulsion comprising a hydrophilic and a hydrophobic nonionic surfactant, said aqueous composition further comprising a persulfate salt, or mixtures thereof, and a radical scavenger, or mixtures thereof. Said composition has a pH as is of from 0 to 0.9.

The present invention also encompasses a process of treating surfaces, preferably toilet bowls, or fabrics wherein a composition according to the present invention is used in its diluted form.

The present invention also encompasses a process for the manufacture of said composition.

DETAILED DESCRIPTION OF THE INVENTION

The compositions according to the present invention comprise as a first essential ingredient a persulfate salt, or mixtures thereof. Preferably the compositions according to the present invention comprise from 0.1% to 50% by weight of the total composition of said persulfate salt, or mixtures thereof, more preferably from 0.5% to 20% and most preferably from 1% to 10%. Preferred persulfate salt to be used herein is the monopersulfate salt. Examples of monopersulfate salts commercially available are those commercialized by Interox under the trade name Curox®, by Degussa under the trade name Caroat® or by DuPont under the trade name Oxone®. It is to understand herein that when the commercially available Curox®, Caroat® and/or Oxone® are used, the % weights of persulfate salts mentioned herein, refer to the total weight of said Curox®, Caroat® and/or Oxone®. The active concentration is approximately ½ of the total weight. Other persulfate salts such as dipersulfate salts commercially available among others from Peroxide Chemie GMBH can be used in the compositions according to the present invention.

The second essential feature of the compositions according to the present invention is their acidity. In order to obtain desired stability of the persulfate salts in the compositions according to the present invention, said compositions need to be formulated at a pH as is of from 0 to 0.9, preferably of from 0.1 to 0.9 and more preferably of from 0.2 to 0.7. In other words, we have found that by strictly controlling the pH in the above mentioned range, the stability of persulfate salts in a composition is improved. More specifically, we have found that within this highly acidic range there is an optimum pH value at which the stability of persulfate salts is maximized. The specific pH at which this happens, depends on the specificity of each composition, i.e. on the ingredients per se as well as on the proportion of each of them.

The pH of said compositions can be trimmed by appropriate organic or/and inorganic acids which chemically stabilize the compositions and may build up viscosity. Said acids can be added typically from 1% to 20% by weight of the total composition. Examples of organic acids to be used alone or in combination with other organic or/and inorganic acids are sulfonic acids, citric acid, succinic acid, malic acid and the like. An example of inorganic acids to be used herein is sulfuric acid.

The composition according to the present invention further comprises as a third essential ingredient a radical scavenger, or mixtures thereof. All radical scavengers known in the art can be used according to the present invention. For example, suitable radical scavengers to be used herein are substituted mono- and di-hydroxybenzenes and their analogs, $C_2$–$C_{10}$ alkyl carboxylates, aryl carboxylates or mixtures thereof. Preferred radical scavengers to be used in the compositions of the present invention are butylated hydroxy toluene (BHT), alkylated butylated hydroxy toluene, mono-tert-butyl hydroquinone (MTBHQ), benzoic acid, toluic acid, t-butyl catechol, benzyl amines, 1,1,3-tris (2-methyl-4-hydroxy-5-t-butylphenyl) butane commercially available under the trade name Topanol® CA ex ICI or n-propyl-gallate commercially available from Nipa Laboratories UK and Seac France, or mixtures thereof.

The compositions of the present invention comprise from 0.01% to 10% by weight of the total composition of a radical scavenger, or mixtures thereof, preferably of from 0.01% to 5% and more preferably of from 0.01% to 1%.

The preferred compositions according to the present invention further comprise a surfactant, or mixtures thereof. Preferably the compositions according to the present invention comprise from 0.1% to 50% by weight of the total composition of said surfactant, or mixtures thereof, more preferably from 1% to 30% and most preferably from 2% to 20%. Nonionic surfactants are preferred to be used herein. Indeed it has been found that they contribute to the stability of the persulfate salts in the compositions of the present invention.

Suitable nonionic surfactants to be used herein are alkoxylated alcohol nonionic surfactants or alkoxylated carboxylic acids (which are also nonionic surfactants at the pH ranges of our compositions) which can be readily made by condensation processes which are well known in the art. However, a great variety of such alkoxylated alcohols or alkoxylated carboxylic acids, especially ethoxylated and/or propoxylated alcohols or acids are also conveniently commercially available. Surfactants catalogs are available which list a number of surfactants, including nonionics, together with their respective HLB values.

Accordingly, preferred alkoxylated alcohols for use herein are nonionic surfactants according to the formula RO(E)e(P)p where R is a hydrocarbon chain of from 6 to 22 carbon atoms, E is ethylene oxide and P is propylene oxide, and e and p which represent the average degree of respectively ethoxylation and propoxylation, are of from 0 to 60. A particular suitable nonionic surfactant is for instance Dobanol$^R$ 91-10 (R=C9–C11, e=10, p=0) which is commercially available from Shell.

Examples of alkoxylated carboxylic acids are surfactants according to the formula R(E)eOCH2COOH, where R is a hydrocarbon chain of from 6 to 22 carbon atoms, E is ethylene oxide and e, which represents the average degree of respectively ethoxylation, is of from 0 to 60. An example of these surfactants is Akypo® LF1 (R=C8, e=5) which is commercially available from Chemy.

Highly preferred compositions according to the present invention can be suitably prepared in the form of an emulsion of at least two nonionic surfactants. Said two nonionic surfactants must have different HLB values (hydrophilic lipophilic balance) in order to form emulsions which are stable, and preferably the difference in value of the HLBs of said two surfactants is of at least 1 and preferably of at least 3. By appropriately combining at least two of said nonionic surfactants with different HLBs, emulsions according to the present invention will be formed.

One of said nonionic surfactants used herein is a nonionic surfactant with an HLB above 11 (herein referred to as hydrophilic nonionic surfactant), whereas the other one is a nonionic surfactant with an HLB below 10 (herein referred to as hydrophobic nonionic surfactant).

A great variety of the alkoxylated fatty alcohols to be used herein have very different HLB values. The HLB values of such alkoxylated nonionic surfactants depend essentially on the chain length of the fatty alcohol, the nature of the alkoxylation and the degree of alkoxylation. Hydrophilic nonionic surfactants tend to have a high degree of alkoxylation and a short chain fatty alcohol, while hydrophobic surfactants tend to have a low degree of alkoxylation and a long chain fatty alcohol.

In the preferred emulsions according to the present invention said hydrophobic and hydrophilic nonionic surfactants are alkoxylated alcohols according to the present invention where the R group is a hydrocarbon chain with only from 6 to 13 carbon atoms, preferably from 8 to 11. A particularly suitable system comprises a hydrophobic nonionic surfactant for instance Dobanol® 91-2.5 (HLB=8.2) or Dobanol® 23-3 (HLB=8.2) or mixtures thereof, and a hydrophilic nonionic surfactant for instance Dobanol®91-10 (HLB= 14.7) or $C_8(EO)_4$ (HLB=11.5) manufactured by Henkel, or mixtures thereof. The Dobanol® surfactants are commercially available from Shell.

The compositions according to the present invention may further comprise other nonionic surfactants which should however not significantly alter the weighted average HLB value of the overall composition.

The compositions according to the present invention are stable. By "stable" it is meant herein that a composition according to the present invention comprising a persulfate salt, or mixtures thereof, does not undergo more than 15% persulfate loss, preferably not more than 10%, in three months at 20° C. Persulfate concentration can be measured by titration with potassium permanganate, or alternatively, with Cerium (IV) sulfate, after reduction with a solution containing ammonium ferrous sulfate. The test method to measure persulfate concentration by titration with potassium permanganate is well-known in the art and is reported, for example, on the technical information sheet of Curox® commercially available from Interox. Alternatively, persulfate concentration can also be measured using a chromatography method described in the literature for peracids (F. Di Furia et al., Gas-liquid Chromatography Method for Determination of Peracids, Analyst, Vol 113, May 1988, p 793–795).

The compositions according to the present invention are aqueous. Accordingly, the compositions according to the present invention comprise from 10% to 95% by weight of the total composition of water, preferably from 30% to 90%, most preferably from 60% to 85%. Deionized water is preferably used.

In one embodiment, the compositions of the present invention are free of hydrogen peroxide. Said compositions are particularly stable. However, in other embodiments of the present invention, the compositions of the present invention can comprise from 0.1% to 15% by weight of the total composition of hydrogen peroxide, preferably from 2% to 10%. In the latter case, the source of mono- or di-persulfate can be either a salt or a solution containing mono- or di-persulfuric acids, or a mixtures thereof, together with hydrogen peroxide. Said compositions exhibit outstanding cleaning performances.

Depending on the end use envisioned, the compositions according to the present invention may further comprise a variety of other ingredients including other surfactants of all types, organic or inorganic alkalis, perfumes, dyes, optical brighteners, builders, chelants, soil-suspending agents, pigments, enzymes, dye transfer inhibitors, solvents, buffering agents, stabilizers and the like.

The present invention further encompasses a process of treating hard-surfaces wherein a composition as hereinbefore defined is used in its diluted form. By "in its diluted form" it is meant herein that the compositions according to the present invention may be diluted with water up to, for example a pH of around or higher than 2. Said dilution may occur either before, after or while said composition is applied to a hard-surface.

Compositions according to the present invention find a preferred application in the cleaning of hard-surfaces, particularly toilet bowls and bath tubs. In this field it is preferred to use a process of treating a hard-surface wherein a composition according to the present invention is diluted after or while it is applied to said surface. For example, said composition may be dispensed from a container onto said hard-surface, then diluted in water and left to act onto said surfaces, then removed by rinsing or flushing.

However, the compositions according to the present invention are also particularly suitable to be used for denture applications. In this field it is suitable to use a process of treating a hard-surface wherein a composition according to the present invention is either diluted before, after or while said composition is applied to said surface. For example said composition may be first diluted in water before it is applied to said denture or may be diluted in water which is already in contact with a denture.

Also, the compositions according to the present invention may be used in diluted form in laundry applications, e.g. in hand applications as well as in washing machine. In this field it is suitable to use a process of treating fabrics wherein said fabrics are contacted with a composition of the present invention in diluted form, then said fabrics are allowed to remain in contact with said composition for a period of time sufficient to treat said fabrics, then said fabrics are rinsed in water to remove said composition.

As used in the foregoing paragraphs, the expression "treating" includes washing as the compositions according to the present invention comprise surfactants and bleaching as the compositions according to the present invention comprise persulfate salts.

The present invention further encompasses a process for the manufacture of the emulsions described herein. The process according to the present invention comprises at least three steps:

In the first step, a hydrophobic mixture is prepared which comprises said hydrophobic nonionic surfactant and radical scavengers together with other hydrophobic ingredients if present in the composition such as chelating agents, perfumes, solvents, enzymes.

In the second step, a hydrophilic mixture is prepared which comprises at least said water, said hydrophilic nonionic surfactant and said persulfate salts. Said hydrophilic mixture optionally further comprises other hydrophilic ingredients which are to be formulated in the composition such as dyes, optical brighteners, builders, stabilizers, chelants, an organic and/or inorganic acid or mixtures thereof, hydrogen peroxide and buffering agents. The pH of said hydrophilic phase is adjusted to the desired value before the third step.

Naturally, said first and said second steps can be performed in any order, i.e. second step first is also suitable.

In the third step of the process according to the present invention, said hydrophobic mixture and said hydrophilic mixture are mixed together and stirred.

The present invention is further illustrated by the following examples.

EXPERIMENTAL DATA

Compositions are made which comprise the listed ingredients in the listed proportions (weight %).

| Compositions: | #1 | #2 | #3 |
|---|---|---|---|
| Dobanol ® 91-2.5 (R = C9–C11, e = 2.5, p = 0) | 4.9% | 4.9% | 4.9% |
| Dobanol ® 91-10 (R = C9–C11, e = 10, p = 0) | 2.1% | 2.1% | 2.1% |
| Curox ®* | 6.0% | 6.0% | 6.0% |
| Cyclohexane | 0.5% | 0.5% | / |
| Perfume | / | / | 0.5% |
| Citric acid | / | / | 6.0% |
| Butylhydroxytoluene (BHT) | / | 0.05% | / |
| Water and minors | -------up to 100%------- | | |
| Methane sulphonic to adjust pH | yes | yes | no |
| Sulfuric acid to adjust pH | no | no | yes |

*Curox ® is one of the commercial names of monopersulfate salts

All the above mentioned compositions are emulsions of nonionic surfactants. Compositions #1 and #3 are free of BHT and composition #2 comprises BHT.

Stability Data

Said compositions #1, #2 and #3 were prepared at different pH values by adding methane sulphonic or sulfuric acid as mentioned herein above. Then, said compositions were evaluated in terms of the amount of monopersulfate present in said compositions at a given time after their preparation. The compositions were kept at a temperature of 20° C.

The method used for measuring the monopersulfate content remaining in said compositions was a Cerium (IV) sulfate titration after reduction with a solution containing ammonium ferrous sulfate. This titration is described in Curox technical sheets from Interox. Only variation is the use of Cerium (IV) sulfate instead of potassium permanganate that is not selective enough since it oxidizes also the surfactants present in the compositions.

The table below lists the results obtained for the above mentioned compositions at different pH, in terms of % monopersulfate loss in said compositions at different times following the preparation of said compositions.

| | Results: | | | |
|---|---|---|---|---|
| | 2 weeks | 4 weeks | 8 weeks | 12 weeks |
| Composition #1: | | | | |
| pH = 1.1 | 8.1 | 14.4 | n.a. | n.a. |

-continued

|  | Results: | | | |
| --- | --- | --- | --- | --- |
|  | 2 weeks | 4 weeks | 8 weeks | 12 weeks |
| pH = 0.5 | 0 | 0 | 0 | 1.9 |
| pH = 0.2 | 0 | 0 | 0 | 2.4 |
| Composition #2: | | | | |
| pH = 0.5 | 0 | 0 | 0 | 0 |
| pH = 0.2 | 0 | 0 | 0 | 1.3 |
| Composition #3: | | | | |
| pH = 1.0 | 28.8 | 41.2 | n.a. | n.a. |
| pH = 0.5 | 20.7 | 34.9 | n.a. | n.a. |
| pH = 0.2 | 0 | 3.3 | n.a. | n.a. |
| pH = 0 | 2.3 | 8.9 | n.a. | n.a. | n.a. indicates that the results were not measured.

Comments

The results show the criticality of the selection of the very narrow highly acidic pH range of the present invention (see in particular the results obtained with compositions #1 and #3 at different pH) and the additional benefit, in terms of stability upon a prolonged period of time, due to the presence of BHT in the compositions of the present invention (see composition #2 versus composition #1).

Indeed, the results obtained with composition #2 surprisingly show that compositions according to the present invention, having a pH in the preferred range of the present invention, e.g. pH=0.2 or pH=0.5, and further comprising BHT, have virtually no monopersulfate loss after 12 weeks at 20° C.

The results above show that the stability of the compositions is improved when said pH is in the range of 0 to 0.9 and that within that range there is a pH at which the stability of monopersulfate is maximized. Said pH depends on the composition itself (see results for composition #1 and #3).

EXAMPLES

Further compositions are made which comprise the listed ingredients in the listed proportions (weight %).

| Compositions: | #1 | #2 | #3 |
| --- | --- | --- | --- |
| Dobanol ® 23-3 (R = C9–C11, e = 3, p = 0) | 2% | / | / |
| Dobanol ® 91-10 (R = C9–C11, e = 10, p = 0) | 4% | 7% | / |
| Akypo LF1 ® (R = C8, e = 5) | / | / | 10% |
| Curox ®* | 5% | 10% | 3% |
| Perfume | 0.7% | 0.4% | 0.2% |
| Butylhydroxytoluene | 0.1% | 0.2% | 0.4% |
| Water and minors | ------up to 100%------ | | |
| Sulfuric acid up to pH | 0 | 0.5 | 0.9 |

The above compositions surprisingly exhibit excellent physical and chemical stability upon prolonged periods of time of several months at room temperature. Furthermore, these compositions according to the present invention are particularly efficient in terms of cleaning, bleaching and/or disinfecting. These compositions are particularly effective in toilet soils cleaning, both when used neat or diluted.

What is claimed is:

1. A stable aqueous composition comprising a monopersulfate salt, or mixtures thereof, and a radical scavenger, or mixtures thereof, said composition being formulated at a pH as is of from 0 to 0.5.

2. A composition according to claim 1 wherein the level of said monopersulfate salt or mixtures thereof is from about 0.1% to about 50% by total weight of the composition.

3. A composition according to claim 1 wherein said radical scavenger is selected from the group consisting of butylated hydroxy toluene, alkylated butylated hydroxy toluene, mono-tert-butyl hydroquinone, benzoic acid, toluic acid, t-butyl catechol, benzyl amines, 1,1,3-tris(2-methyl-4-hydroxy-5-t-butylphenyl) butane, n-propyl-gallate, or mixtures thereof.

4. A composition according to claim 1 which comprises from about 0.01% to about 10% by weight of the total composition of said radical scavenger, or mixtures thereof.

5. A composition according to claim 1 wherein said composition is free of hydrogen peroxide.

6. A process of treating a hard-surface or fabrics wherein a composition according to claim 1 is used in its diluted form.

7. A process of treating a hard-surface according to claim 6 wherein said surface is a toilet bowl.

8. A composition according to claim 1 wherein said composition further comprises from about 0.1% to about 50% by weight of the total composition of a surfactant or mixtures thereof.

9. A composition according to claim 8 comprising from about 2% to about 20% by weight of the total composition of said surfactant or mixtures thereof.

10. A composition according to claim 8 wherein said radical scavenger is selected from the group consisting of butylated hydroxy toluene, alkylated butylated hydroxy toluene, mono-tert-butyl hydroquinone, benzoic acid, toluic acid, t-butyl catechol, benzyl amines, 1,1,3-tris(2-methyl-4-hydroxy-5-t-butylphenyl) butane, n-propyl-gallate, or mixtures thereof.

11. A composition of claim 8 wherein said composition is free of hydrogen peroxide.

12. A composition according to claim 8 wherein said surfactant is a nonionic surfactant or mixtures thereof.

13. A composition according to claim 12 wherein said nonionic surfactant is an alkoxylated alcohol of the formula RO(E)e(P)p where R is a hydrocarbon chain of from about 6 to about 22 carbon atoms, E is ethylene oxide and P is propylene oxide, and e and p which represent the average degree of, respectively ethoxylation and propoxylation, are of from 0 to 60.

14. A composition according to claim 8 wherein said surfactant component is an admixture of a hydrophilic nonionic surfactant having an HLB above 10 and a hydrophobic nonionic surfactant having an HLB below 10 and whereby said composition is in the form of an emulsion, and wherein the HLB's of the hydrophilic and hydrophobic nonionic surfactants differ by at least 3.

15. A composition according to claim 14 wherein said nonionic surfactants are alkoxylated alcohols of the formula RO(E)e(P)p where R is a hydrocarbon chain of from about 6 to about 22 carbon atoms, E is ethylene oxide and P is propylene oxide, and e and p which represent the average degree of, respectively ethoxylation and propoxylation, are of from 0 to 60.

16. A composition of claim 14 wherein said composition is free of hydrogen peroxide.

17. A composition according to claim 8 wherein the level of said monopersulfate salt or mixtures thereof is from about 0.1% to about 50% by total weight of the composition.

18. A composition according to claim 17 wherein the level of said monopersulfate salt or mixtures thereof is from about 1% to about 10% by total weight of the composition.

19. A composition according to claim 8 which comprises from about 0.01% to about 10% by weight of the total composition of said radical scavenger, or mixtures thereof.

20. A composition according to claim 19 which comprises from about 0.01% to about 1% by weight of the total composition of said radical scavenger, or mixtures thereof.

21. A stable aqueous composition comprising from about 2% to about 20% by weight of the total composition of a nonionic surfactant or mixtures thereof, from about 1% to about 10% by weight of monopersulfate salts, and from about 0.01% to about 1% by weight of a radical scavenger, said radical scavenger being selected from the group consisting of butylated hydroxy toluene, alkylated butylated hydroxy toluene, mono-tert-butyl hydroquinone, benzoic acid, toluic acid, t-butyl catechol, benzyl amines, 1,1,3-tris (2-methyl-4-hydroxy-5-t-butylphenyl) butane, n-propyl-gallate, or mixtures thereof and said composition being formulated at a pH as is from about 0.2 to about 0.7.

22. A process of treating a hard-surface or fabrics wherein a composition according to claim 21 is used in its diluted form.

23. A composition according to claim 21 wherein said surfactant component is an admixture of a hydrophilic nonionic surfactant having an HLB above 10 and a hydrophobic nonionic surfactant having an HLB below 10 as the surfactant and whereby said composition is in the form of an emulsion wherein the HLB's of the hydrophilic and hydrophobic nonionic surfactants differ by at least 3.

24. A composition of claim 23 wherein said composition is free of hydrogen peroxide.

* * * * *